(12) United States Patent
Gerlach et al.

(10) Patent No.: US 11,559,921 B2
(45) Date of Patent: Jan. 24, 2023

(54) PREFORMS FOR BLOW MOLDING AND ADDITIVE MANUFACTURING THEREOF

(71) Applicant: The Procter & Gamble Company, Cincinnati, OH (US)

(72) Inventors: Christian Gerhard Friedrich Gerlach, St. Gilles (BE); Pedro Vincent Vandecappelle, Wetteren (BE)

(73) Assignee: The Procter & Gamble Company, Cincinnati, OH (US)

( * ) Notice: Subject to any disclaimer, the term of this patent is extended or adjusted under 35 U.S.C. 154(b) by 85 days.

(21) Appl. No.: 16/939,131

(22) Filed: Jul. 27, 2020

(65) Prior Publication Data

US 2022/0024077 A1   Jan. 27, 2022

(51) Int. Cl.
| | | |
|---|---|---|
| *B29C 49/02* | (2006.01) | |
| *B29B 11/06* | (2006.01) | |
| *B33Y 80/00* | (2015.01) | |
| *B65D 1/02* | (2006.01) | |
| *B33Y 10/00* | (2015.01) | |
| *B29L 31/00* | (2006.01) | |

(52) U.S. Cl.
CPC .............. *B29B 11/06* (2013.01); *B29C 49/02* (2013.01); *B33Y 80/00* (2014.12); *B65D 1/0223* (2013.01); *B29C 2949/077* (2022.05); *B29C 2949/0813* (2022.05); *B29C 2949/0817* (2022.05); *B29L 2031/7158* (2013.01); *B33Y 10/00* (2014.12)

(58) Field of Classification Search
CPC ......... B29B 11/06; B29B 11/14; B29C 49/02; B29C 2949/077; B29C 2949/0813; B29C 2949/0817; B29C 2949/30; B29C 2949/3008; B29C 2949/3012; B29C 2949/3016; B29C 2949/3064; B29C 2949/3068; B29C 2949/0829; B29C 2949/0811; B29C 49/12; B29L 2031/7158; B65D 1/0223
See application file for complete search history.

(56) References Cited

U.S. PATENT DOCUMENTS

| | | | |
|---|---|---|---|
| 3,869,056 A | 3/1975 | Valyi | |
| 4,420,581 A | 12/1983 | Mcfarlane | |
| 6,197,851 B1 | 3/2001 | Maxwell | |
| 8,039,577 B2 | 10/2011 | Xia | |
| 9,205,592 B2 | 12/2015 | Gerlach | |
| 9,758,294 B2 | 9/2017 | Mcdaniel | |
| 10,220,562 B2 | 3/2019 | Smith | |
| 10,322,538 B2 | 6/2019 | Zeik | |
| 10,407,202 B2 | 9/2019 | Zeik | |
| 10,695,966 B2 | 6/2020 | Zeik | |

(Continued)

FOREIGN PATENT DOCUMENTS

CN   106738798 A   5/2017

OTHER PUBLICATIONS

PCT Search Report and Written Opinion for PCT/US2021/043149 dated Nov. 2, 2021, 17 pages.

(Continued)

*Primary Examiner* — Jason L Vaughan
*Assistant Examiner* — Amanda Kreiling
(74) *Attorney, Agent, or Firm* — Steven Robert Chuey; James E Oehlenschlager

(57) ABSTRACT

A preform and methods for making the preform, as well as containers made by blow molding an additive manufactured preform.

9 Claims, 10 Drawing Sheets

(56) References Cited

U.S. PATENT DOCUMENTS

| | | |
|---|---|---|
| 2013/0207317 A1 | 8/2013 | Gerlach |
| 2019/0061278 A1 | 2/2019 | Schamp |
| 2019/0152122 A1 | 5/2019 | Smith |
| 2019/0352036 A1 | 11/2019 | Zeik |
| 2020/0198214 A1* | 6/2020 | Rizzo .................... B29C 49/22 |

OTHER PUBLICATIONS

All Office Actions; U.S. Appl. No. 16/939,151, filed Jul. 27, 2020.
U.S. Appl. No. 16/939,151, filed Jul. 27, 2020, Christian Gerhard Friedrich Gerlach et al.

* cited by examiner

PREFORMS FOR BLOW MOLDING AND ADDITIVE MANUFACTURING THEREOF

FIELD OF THE INVENTION

The present invention relates to preforms and methods for making preforms by additive manufacturing. The present invention also relates to blow molded articles and methods of making blow molded articles from additive manufactured preforms.

BACKGROUND OF THE INVENTION

Additive Manufacturing (AM) describes technologies that build 3D articles by adding layer-upon-layer of one or more materials. The term AM encompasses many technologies including subsets like 3D printing, Rapid Prototyping (RP), Direct Digital Manufacturing (DDM), layered manufacturing and additive fabrication. Common to AM technologies is the use of a computer, 3D modeling software (Computer Aided Design or CAD), machine equipment, and layering material. For example, a CAD sketch may be used to provide data to equipment that lays downs or adds successive layers of liquid, powder, sheet material, polymer, or other material, in a layer-upon-layer fashion to fabricate a 3D article. Advantages of 3D printing articles include less material usage, lower labor costs, lower machine operation costs, and the ability for rapid prototyping of designs.

However, there are many challenges that must be considered when using AM to produce a bottle or container. For example, it can be difficult to use AM to produce a bottle with enough strength to be used commercially.

Currently, many containers are produced through a blow molding process. In the blow molding process, a preform can be manufactured through extrusion molding or injection molding. The preform is then inflated by adding pressurized air through the inlet of a mold cavity of the desired container shape. Blow molding can be used to produce containers of a variety of plastics, such as high-density polyethylene (HDPE), polyethylene terephthalate (PET), polypropylene (PP), low-density polyethylene (LDPE), polystyrene (PS), poly(vinyl chloride) (PVC), and polylactic acid (PLA).

Many polymers, such as PET, achieve biaxial molecular orientation upon the stretching experienced during blow molding processes to manufacture containers. Biaxial molecular orientation is a physical alignment of the polymer chains in a regular configuration. Polymers that have achieved biaxial molecular orientation can demonstrate improved bottle impact strength, transparency, surface gloss, stiffness, and gas-barrier performance. Thus, many containers are first molded into a preform and then blow molded into the final container to achieve biaxial molecular orientation. Stretching a preform during the blow molding process also allows for a thinner container wall, which can save on material usage.

However, 3D printed containers do not have the impact strength, stiffness, and gas permeability to be effectively utilized as containers for commercial products because the polymers do not achieve biaxial orientation. Thus, there is a need for a container that combines the benefits of 3D printing with the improved properties demonstrated once a polymer achieves biaxial orientation. As such, the present invention is directed to new preforms made by AM.

SUMMARY OF THE INVENTION

Disclosed herein is a preform for producing a blow molded article comprising an open-ended neck comprising an exterior neck polymer road forming an exterior surface of the neck of the preform and an interior neck polymer road forming an interior surface of the neck of the preform; a body comprising an exterior body polymer road forming an exterior surface of the body of the preform and an interior body polymer road forming an interior surface of the body of the preform, a body infill portion between the exterior body polymer road and the interior body polymer road comprising one or more wall body polymer roads, wherein the one or more wall body polymer roads are concentric to exterior body polymer road and the interior body polymer road; and a closed endcap comprising an exterior endcap polymer road forming an exterior surface of the endcap of the preform and an interior endcap polymer road forming an interior surface of the endcap of the preform, an endcap infill portion between the exterior endcap polymer road and the interior endcap polymer road comprising one or more wall endcap polymer roads, wherein the one or more wall endcap polymer roads are concentric to exterior endcap polymer road and the interior endcap polymer road.

Also disclosed herein is a preform made by a process comprising the steps of providing a digital description of a three-dimensional preform, adding concentrically filled roads of a polymer to satisfy a first layer of the digital description, and incrementally adding successive layers on top of the first layer to generate a preform.

Also disclosed herein is a preform for producing a blow molded article comprising an open-ended neck comprising one or more polymer roads; a body comprising one or more layers of one or polymer roads forming a wall of the body; and a closed endcap comprising one or more polymer roads, wherein the wall of the body comprises less than about 12% of layers with an actual thickness less than 95% of a weighted average thickness of the wall of the body.

Also disclosed herein is a blow molded article produced from the preforms described herein.

Also disclosed herein is a method for manufacturing a blow molded article comprising: (a) Providing a digital description of a three-dimensional preform, (b) Depositing concentrically filled polymer roads to satisfy a first layer of digital description, (c) Incrementally depositing successive layers on top of the first layer to generate the preform, and (d) Forming a blow molded article from the preform using a blow molding process.

DETAILED DESCRIPTION OF THE INVENTION

Figure 1:
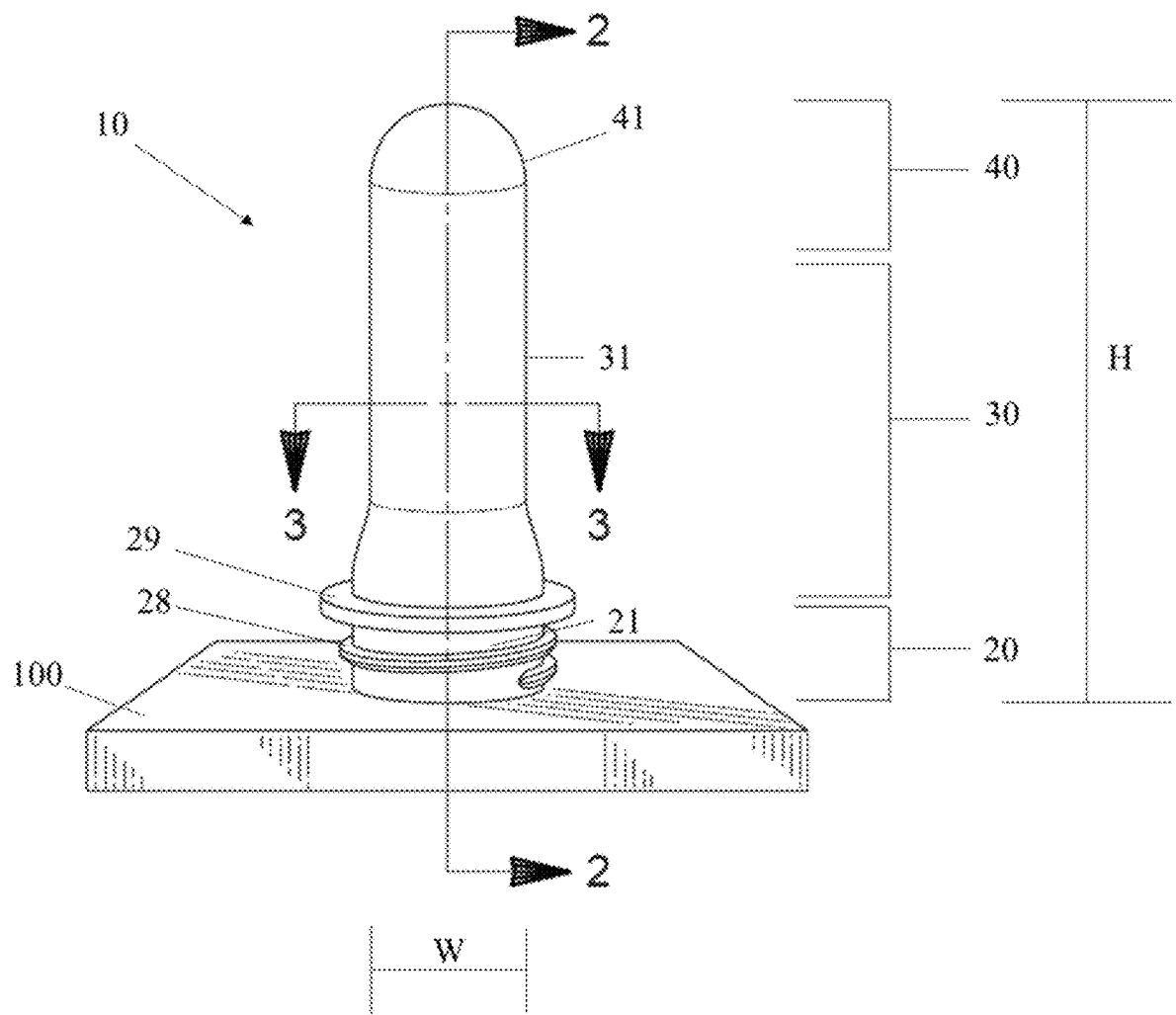
FIG. 1 is a perspective view of a preform on a build plate.

Containers have been previously created through AM and 3D printing techniques. However, it has not been previously possible to use AM or 3D printing to create a container with enough strength to be used in commercial packaging processes while maintaining other desirable packaging qualities, such as wall thickness, and minimizing complexity and cost.

Many current containers made from PET are first injection molded into a preform. Then, the preforms are blow molded into a final container, which allows the PET polymer molecules to achieve biaxial orientation. Containers that are made from polymer molecules with biaxial orientation have thin walls, but demonstrate improved impact strength and gas permeability.

Thus, the present invention is directed to a novel preform (10), the method for making the preform (10), and the resulting blow molded article (90) formed from the preform (10). 3D printing can be used to generate the novel preform (10), as described herein.

Additionally, it has been unexpectedly found that printing each layer of the preform using concentric infill is preferred instead of linear infill, which is typically used. Without wishing to be bound by theory, it is believed that using a concentric infill leads to a better adhesion between the polymer roads and/or minimizes the air gaps between the polymer roads. It is theorized that these features lead to a stronger preform wall, which is better able to survive the blow molding process.

The foregoing summary is not intended to define every aspect of the invention, and additional aspects are described in other sections. In addition, the invention includes, as an additional aspect, all embodiments of the invention narrower in scope in any way than the variations defined by specific paragraphs set forth herein. For example, certain aspects of the invention that are described as a genus, and it should be understood that every member of a genus is, individually, an aspect of the invention. Also, aspects described as a genus or selecting a member of a genus should be understood to embrace combinations of two or more members of the genus. With respect to aspects of the invention described or claimed with "a" or "an," it should be understood that these terms mean "one or more" unless context unambiguously requires a more restricted meaning. The term "or" should be understood to encompass items in the alternative or together, unless context unambiguously requires otherwise. If aspects of the invention are described as "comprising" a feature, embodiments also are contemplated "consisting of" or "consisting essentially of" the feature.

As used herein, a "road" is understood to describe at least a partially continuous or a continuous stream of material that has been extruded out of the nozzle of a 3D printer. A single layer of a 3D printed article can comprise many roads of material in a variety of orientations, such as concentric or linear. While specific reference is provided herein to "polymer roads," the roads can be made of any material that can be extruded out of a nozzle through additive manufacturing techniques.

As used herein, a "digital voxel" is understood to describe a value on a regular grid in three-dimensional space of a particular portion of an object. Thus, a digital description of the object to be created or manipulated by AM can comprise a set of voxels created by and/or inputted into computer aided design software.

As used herein, a "printed voxel" is understood to describe a single volume of material extruded out of the nozzle of a 3D printer or other AM equipment corresponding to a digital voxel in a digital description of an article. Printed voxels can be deposited as polymer roads.

As used herein, "concentric" is understood to describe a series of shapes sharing a common center, with smaller shapes nesting inside larger shapes. The concentric shape can be any polygon, such as, for example, a circle, an oval, a triangle, a square, a pentagon, hexagon, or octagon.

As used herein, "concentric infill" is understood to describe an infill pattern used to create an object using AM where the roads of material are printed from the exterior and interior surface of the object. The infill is then printed from the exterior surface towards the interior surface in concentric shapes or the infill is printed from the interior surface towards the exterior surface in concentric shapes.

As used herein, "linear infill" is understood to describe an infill pattern where the roads of polymer are first printed in the shape of the exterior surface and interior surface of the object. Then, the space between the exterior surface and interior surface of the object is filled by printing roads of polymer in straight or substantially straight lines.

As used herein, a "preform" is understood to describe a precursor to a finished article. For example, for a blow molded article, the preform is the precursor article that is formed of the material that will be expanded or "blown" into the finished article. A preform is necessarily somewhat smaller than the finished blown article. Preforms are generally produced by, for example injection molding, at an elevated temperature in excess of the melt temperature of the material from which they are made. However, a new method for producing a preform, via additive manufacturing, is disclosed herein.

As used herein, the term "blow molding" as used herein is the process in which preforms are heated above their glass transition temperature, and then expanded in molds using a pressurized medium, preferably air, to form hollow articles, such as containers. Often, the preform is stretched with a stretch rod as part of the process.

As used herein, the "z-axis" is the longitudinal axis (or centerline of the article), as in FIG. 1.

As used herein, the "x-y plane" is the plane substantially perpendicular to the z-axis.

Features of the compositions and methods are described below. Section headings are for convenience of reading and not intended to be limiting per se. The entire document is intended to be related as a unified disclosure, and it should be understood that all combinations of features described herein are contemplated, even if the combination of features is not found together in the same sentence, or paragraph, or section of this document. It will be understood that any feature of the methods or compounds described herein can be deleted, combined with, or substituted for, in whole or part, any other feature described herein.

All measurements referred to herein are made at 25° C. unless otherwise specified.

The components of the present compositions and methods are described in the following paragraphs. The FIGURES are intended to be non-limiting examples and represent possible embodiments of the container and methods of use of the container disclosed herein.

Preform

FIG. 1 shows an example of a preform in accordance with the present invention. The preform (10) of the present invention can comprise a neck (20), a body (30), and an endcap (40). Each portion of the preform (10) is named for the final portion it corresponds to in the final blow molded article (90), as in FIG. 4. The neck (20), body (30), and endcap (40) neck (20) can be created as a single, continuous article through an AM technique or the body (30) and endcap (40) can be laid on top of an injection molded neck (20) through an AM technique. FIG. 5 shows an example of a preform (10) and a blow molded article (90) in accordance with the present invention Neck As in FIG. 1, the neck (20) can be the portion of the preform (10) that ultimately ends up being the neck (91) of the blow molded article (90), as in FIG. 4. As shown in FIG. 1, the neck (20) of the preform (10) can be associated with the body (30) of the preform (10). The neck (20) of the preform (10) can be a unitary piece, but may include separate non-structural elements, such as labels, grip structures, threads (28), a lid, a ledge (29) for the lid to rest, etc. associated with the exterior surface (21) of the preform (10). The neck (20) can comprise different regions of different materials, which are intrinsically bonded, chemically bonded, or otherwise associated with one another as a part of the manufacturing process.

The neck's (20) cross-sectional shape can be circular, rectangular, cylindrical, oval, triangular, polygonal, or any other desired shape. The neck's (20) cross-sectional shape can vary or be essentially consistent along the latitudinal axis, as shown in FIG. 1.

Figure 2:
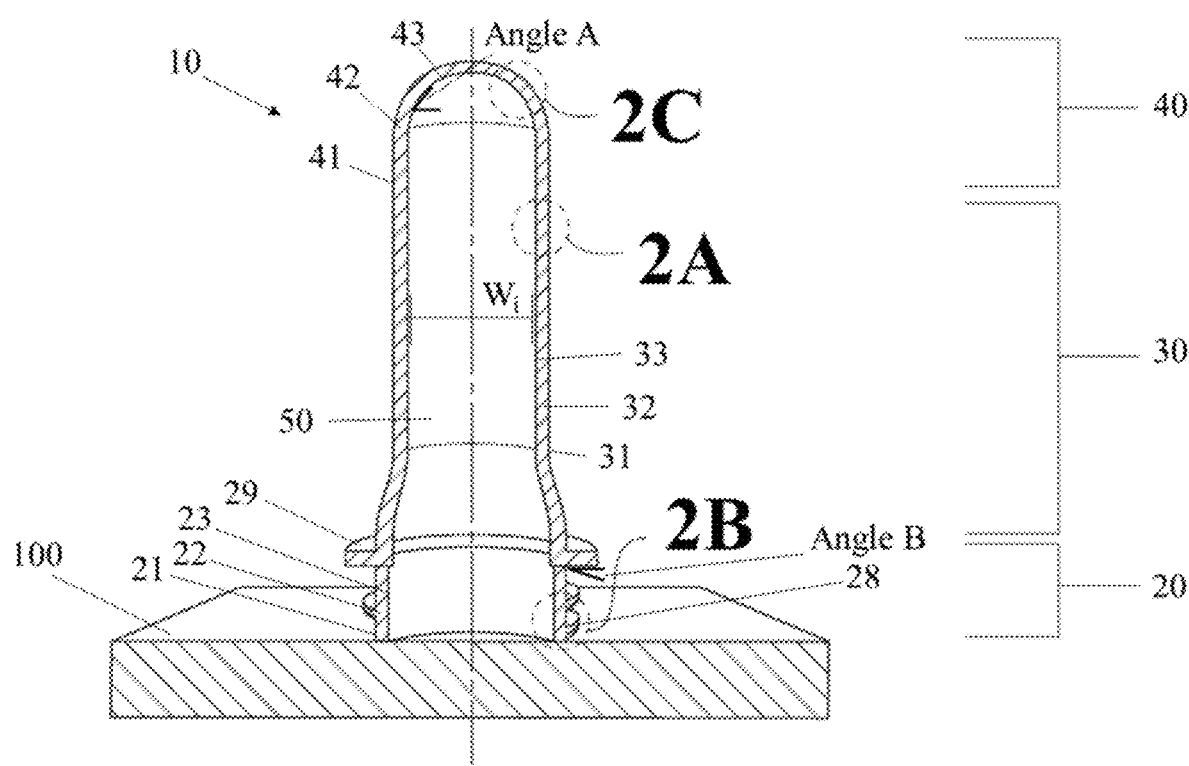
FIG. 2 is a cross-sectional view of the preform of FIG. 1 taken through section line 2.

As shown in FIG. 2, the neck (20) can comprise a wall (22) of the neck (20). The wall (22) of the neck (20) can have an exterior surface (21) and an interior surface (23). The neck (20) can be at least partially open or open, for example, such that a compressed gas can be injected into the preform (10) during the blow molding process to create a blow molded article. The neck (20) can be at least partially open or open so that the blow molded article (90) can be filled with a variety of solid, liquid, aqueous, or combinations thereof components through the neck (91) of the blow molded article (90). As shown in FIG. 2, the void created by the interior surface (23) of the neck (20), the interior surface (33) of the body (30), and the interior surface (43) of the endcap (40) can form the interior portion (50) of the preform (10), and ultimately, after for example, a blow molding process, the interior portion (95) of the blow molded article (90).

Figure 2A:
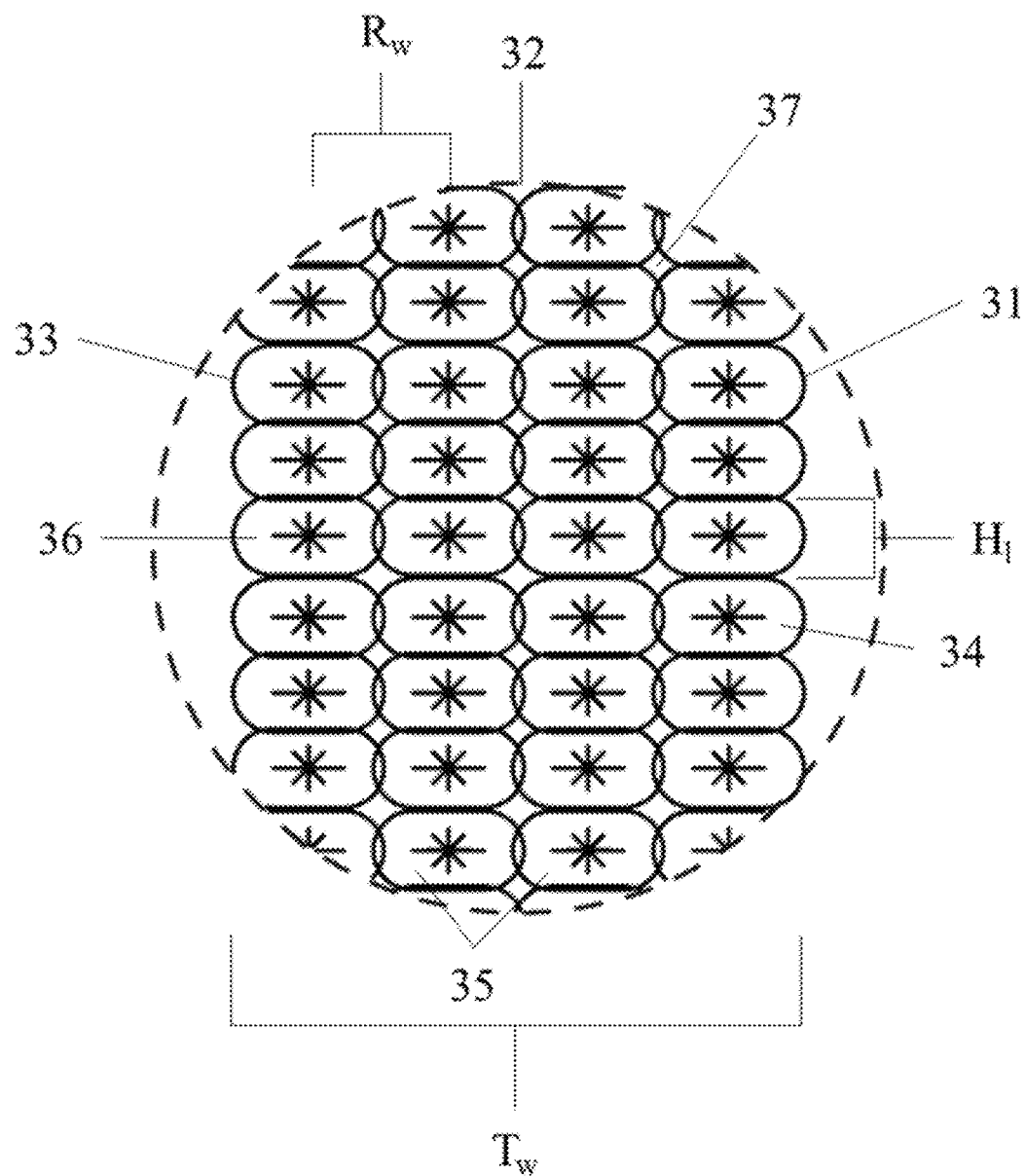
FIG. 2A is a magnified view of a portion of the wall of the body of the preform shown in FIG. 2.
Figure 2B:
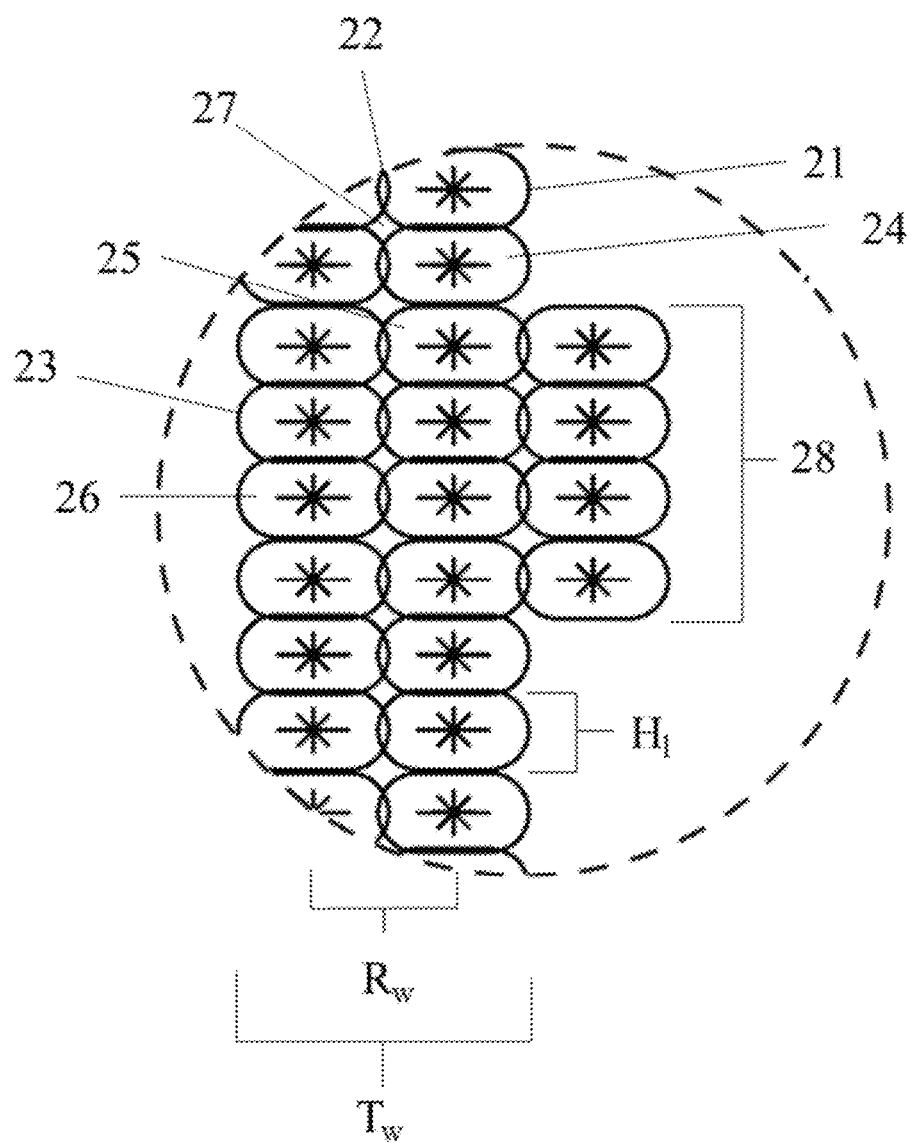
FIG. 2B is a magnified view of a portion of the wall of the neck of the preform shown in FIG. 2.

As shown in FIG. 2B, the neck (20) can comprise an exterior polymer road (24) and an interior polymer road (26) that surround at least a portion of the perimeter of the preform (10). The exterior polymer road (24) and an interior polymer road (26) can be concentric, with the interior polymer road (26) disposed inside of the exterior polymer road (24), i.e. towards the center of the preform (10). As shown in FIG. 2B, the neck (20) can comprise one or more wall polymer roads (25) that are placed between the interior polymer road (26) and the exterior polymer road (24). The one or more wall polymer roads (25) can be concentric with the interior polymer road (26) and the exterior polymer road (24), such that the interior polymer road (26) resides inside the wall polymer road (25) and the wall polymer road (25) resides inside the exterior polymer road (24).

As in FIG. 2B, the threads (28) of the neck (20) can be a single polymer road. However, the threads (28) of the neck (20) can comprise at least a portion of polymer road, such that the polymer road partially overlaps the exterior polymer road (24) of the previously deposited layer.

The wall (22) of the neck (20) can comprise any suitable number of wall polymer roads (25). For example, the wall (22) of the neck (20) may comprise from greater than 0 to 10, from greater than 0 to 5, or from greater than 0 to 3 of the wall polymer roads (25). In total, the wall (22) of the neck (20) can comprise from 2 to 12, from 2 to 7, or from 2 to 5 polymer roads, which include the interior polymer road (26), the exterior polymer road (24), and the wall polymer road (25). Alternatively, the wall (22) of the neck (20) can have zero wall polymer roads (25), such that the wall (22) of the neck (20), only has an exterior polymer road (24) and an interior polymer road (26).

As in FIG. 2B, the wall (22) if the neck (20) can have a consistent thickness throughout, such as, for example, exactly 2 or exactly 4 polymer roads, or the wall (22) of the neck (20) can vary in thickness, such as, for example, 2 polymer road thickness in some portions of the wall (22) and 4 polymer roads in some portions of the wall (22).

The thickness, $T_w$ in FIG. 2B, of the wall (22) of the neck (20) can be from about 0.5 mm to about 20 mm, from about 1 mm to about 20 mm, from about 1 mm to about 10 mm, from about 1 mm to about 3 mm, from about 2 mm to about 6 mm, or from about 2 mm to about 5 mm. As in FIG. 2B, the thickness of the wall (22) of the neck (20) can be a whole number multiple of the thickness of an individual wall polymer road (25) or the road width, $R_w$ in FIG. 2B.

Body

Figure 4:
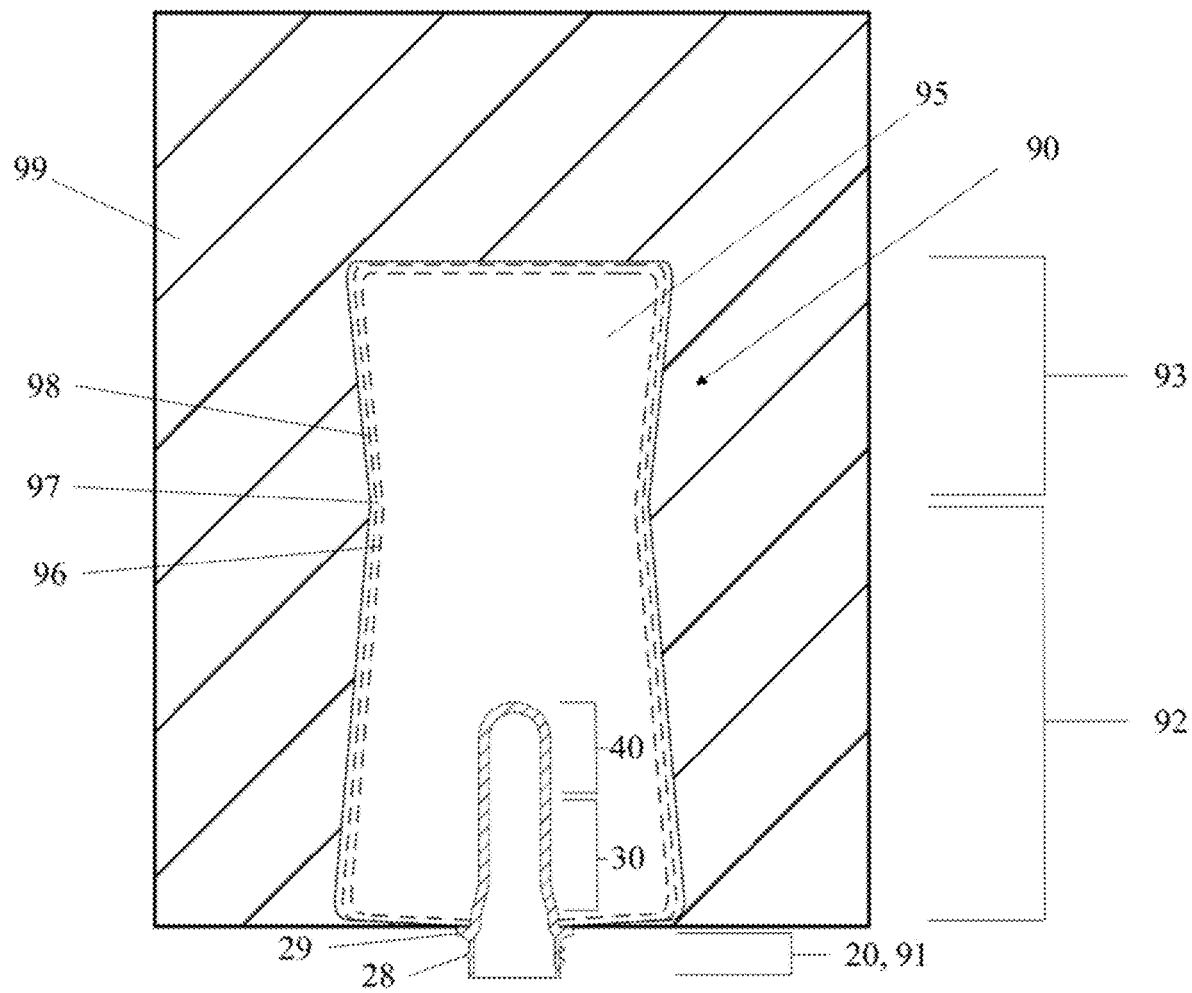
FIG. 4 is a cross-sectional view of exemplary blow molding equipment that could be used to make a blow molded article from a preform.
Figure 5:
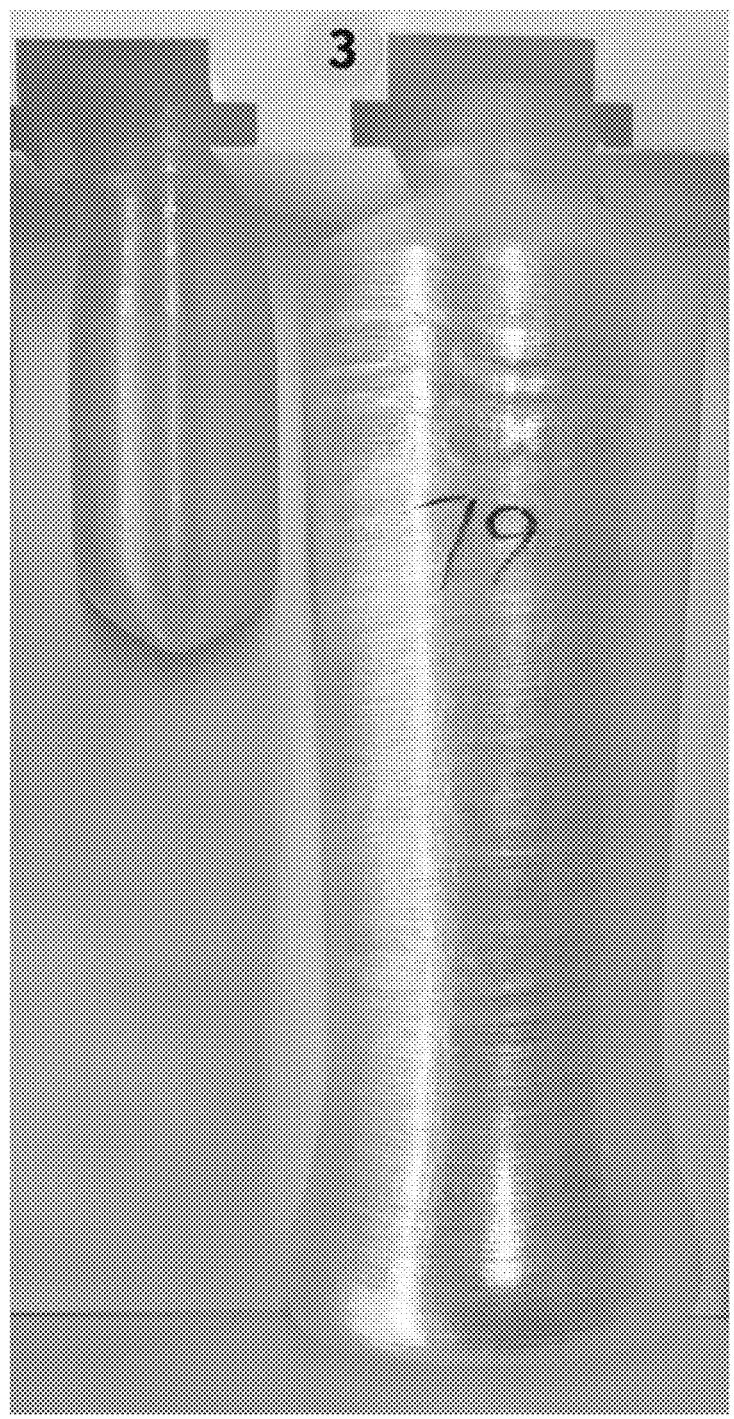
FIG. 5 is a printed preform (left) and a blow molded article (right) formed from a printed preform.

As shown in FIG. 1 the body (30) can be the portion of the preform (10) that ultimately ends up being the body (92) of the blow molded article (90), as in FIG. 4. The body (30) of the preform (10) can be associated with the neck (20) of the preform (10) and the endcap (40) of the preform (10). The body (30) of the preform (10) can be a unitary piece, but may include separate non-structural elements, such as label panels, grip structures, etc. associated with the exterior surface (31) of the preform (10). The body (30) can comprise different regions of different materials, which are intrinsically bonded, chemically bonded, or otherwise associated with one another as a part of the manufacturing process.

The body's (30) cross-sectional shape can be circular, rectangular, cylindrical, oval, triangular, polygonal, or any other desired shape. The body's (30) cross-sectional shape can vary or be essentially consistent along the latitudinal axis, as shown in FIG. 1.

As shown in FIG. 2, the body (30) can comprise a wall (32) of the body (30). The wall (32) of the body (30) can have an exterior surface (31) and an interior surface (33). The body (30) can be at least partially open or open, such that a compressed gas can be injected through the neck (20) and the body (30) during the blow molding process to create a blow molded article (90). The body (30) can be at least partially open or open so that the blow molded article (90) can be filled with a variety of solid, liquid, aqueous, or combinations thereof components through the neck (91) of the blow molded article (90). The void created by the interior surface (23) of the neck (20), the interior surface (33) of the body (30), and the interior surface (43) of the endcap (40) can form the interior portion (50) of the preform (10), and ultimately, after a blow molding process, the interior portion (95) of the blow molded article (90).

Figure 3:
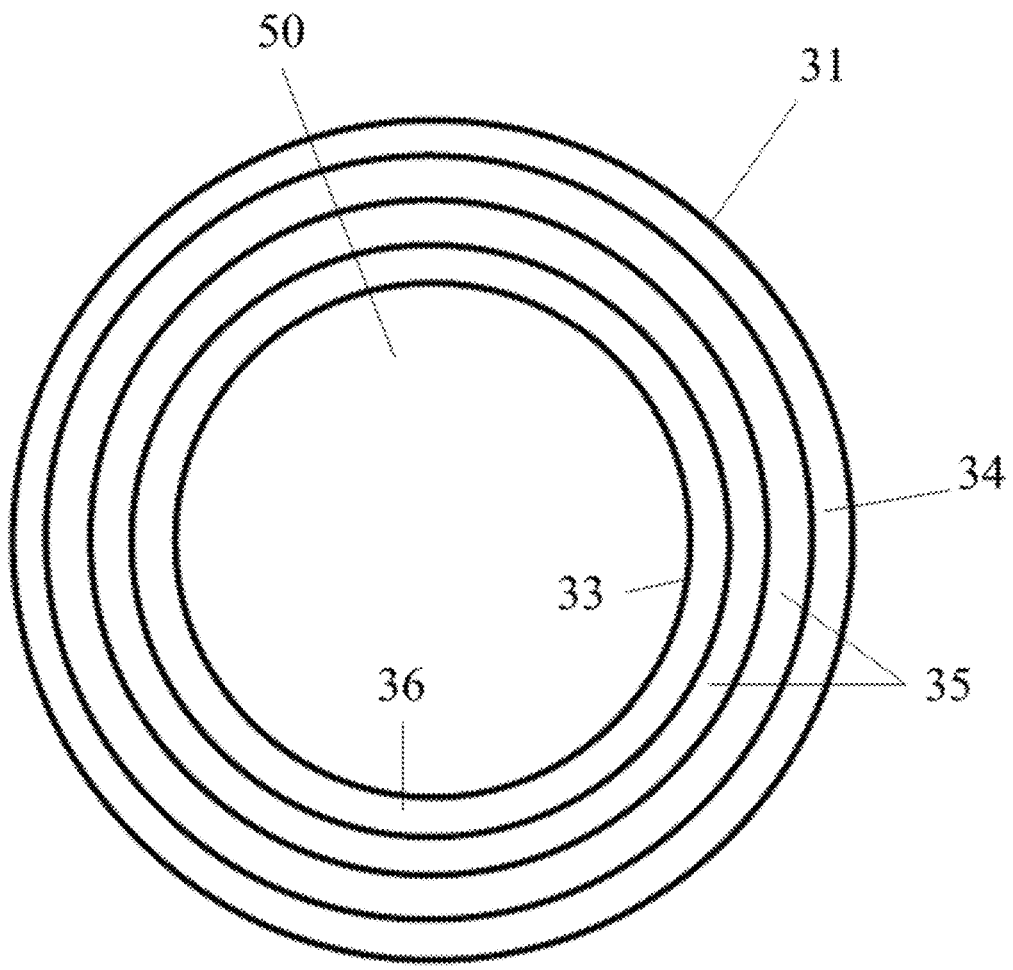
FIG. 3 is a cross-sectional view of a the preform of FIG. 1 taken through section line 3.

As shown in FIGS. 2A and 3, the body (30) can comprise an exterior polymer road (34) and an interior polymer road (36) that surround at least a portion of the perimeter of the preform (10). The exterior polymer road (34) and an interior polymer road (36) can be concentric, with the interior polymer road (36) residing inside the exterior polymer road (34), i.e. towards the interior of the preform (10). The body (30) can comprise one or more wall polymer roads (35) that are placed between the interior polymer road (36) and the exterior polymer road (34). As in FIG. 3, the wall polymer road (35) can be concentric with the interior polymer road (36) and the exterior polymer road (34), such that the interior polymer road (36) resides in the wall polymer road (35) and the wall polymer road (35) resides inside the exterior polymer road (34).

The wall (32) of the body (30) can comprise any suitable number of wall polymer roads (35). For example, the wall (32) of the body (30) may comprise from greater than 0 to 10, from greater than 0 to 5, or from greater than 0 to 3 of the wall polymer roads (35). In total, the wall (32) of the body (30) can comprise from 2 to 12, from 2 to 7, or from 2 to 5 polymer roads, which include the interior polymer road (36), the exterior polymer road (34), and the wall polymer road (35). Alternatively, the wall (32) of the body (30) can have zero wall polymer roads (35), such that the wall (32) of the body (30), only has an exterior polymer road (34) and an interior polymer road (36).

As in FIG. 2A, the wall (32) of the body (30) can have a consistent thickness throughout, such as, for example, exactly 2 or exactly 4 polymer roads, or the wall (32) of the body (30) can vary in thickness, such as, for example, 2 polymer road thickness in some portions of the wall (32) and 4 polymer roads in some portions of the wall (32).

The thickness, $T_w$ in FIG. 2A, of the wall (32) of body (30) can be from about 0.5 mm to about 20 mm, from about 1 mm to about 20 mm, from about 1 mm to about 10 mm, from about 1 mm to about 3 mm, from about 2 mm to about 6 mm, from about 2 mm to about 5 mm, or from about 3 mm to about 8 mm. The thickness, $T_w$ in FIG. 2A, of the wall (32) of body (30) can be greater than about 2 mm, greater than about 2.5 mm, or greater than about 2.75 mm. As in FIG. 2A, the thickness, $T_w$ in FIG. 2A, of the wall (32) of the body (30) can be a whole number multiple of the thickness of an individual wall polymer road (35) or the road width, $R_w$ in FIG. 2A.

Endcap

As shown in FIG. 1, the endcap (40) can be the portion of the preform (10) that ultimately ends up being the base (93) of the blow molded article (90), as in FIG. 4. The endcap (40) of the preform (10) can be associated with the body (30) of the preform (10). The endcap (40) of the preform (10) can be a unitary piece, but may include separate non-structural elements, such as label panels, grip structures, etc associated with the exterior surface (41) of the preform (10). The endcap (40) can comprise different regions of different materials, which are intrinsically bonded, chemically bonded, or otherwise associated with one another as a part of the manufacturing process.

The endcap's (40) cross-sectional shape can be circular, rectangular, cylindrical, oval, triangular, polygonal, or any other desired shape. The endcap's (40) cross-sectional shape can vary or be essentially consistent along the latitudinal axis, as shown in FIG. 1.

As shown in FIG. 2, the endcap (40) can comprise a wall (42) of the endcap (40). The wall (42) of the endcap (40) can have an exterior surface (41) and an interior surface (43). The endcap (40) can be at least partially closed or closed, such that a compressed gas can be injected through the neck (20) and the body (30), but remains in the interior space (50) of the preform (10) during the blow molding process to create a blow molded article (90). The endcap (40) can be at least partially closed or closed so that the blow molded article (90) can be filled with a variety of solid, liquid, aqueous, or combinations thereof components through the neck (91) of the blow molded article (90). The void created by the interior surface (23) of the neck (20), the interior surface (33) of the body (30), and the interior surface (43) of the endcap (40) can form the interior portion (50) of the preform (10), and ultimately, after a subsequent process, the interior portion (95) of the blow molded article (90).

Figure 2C:
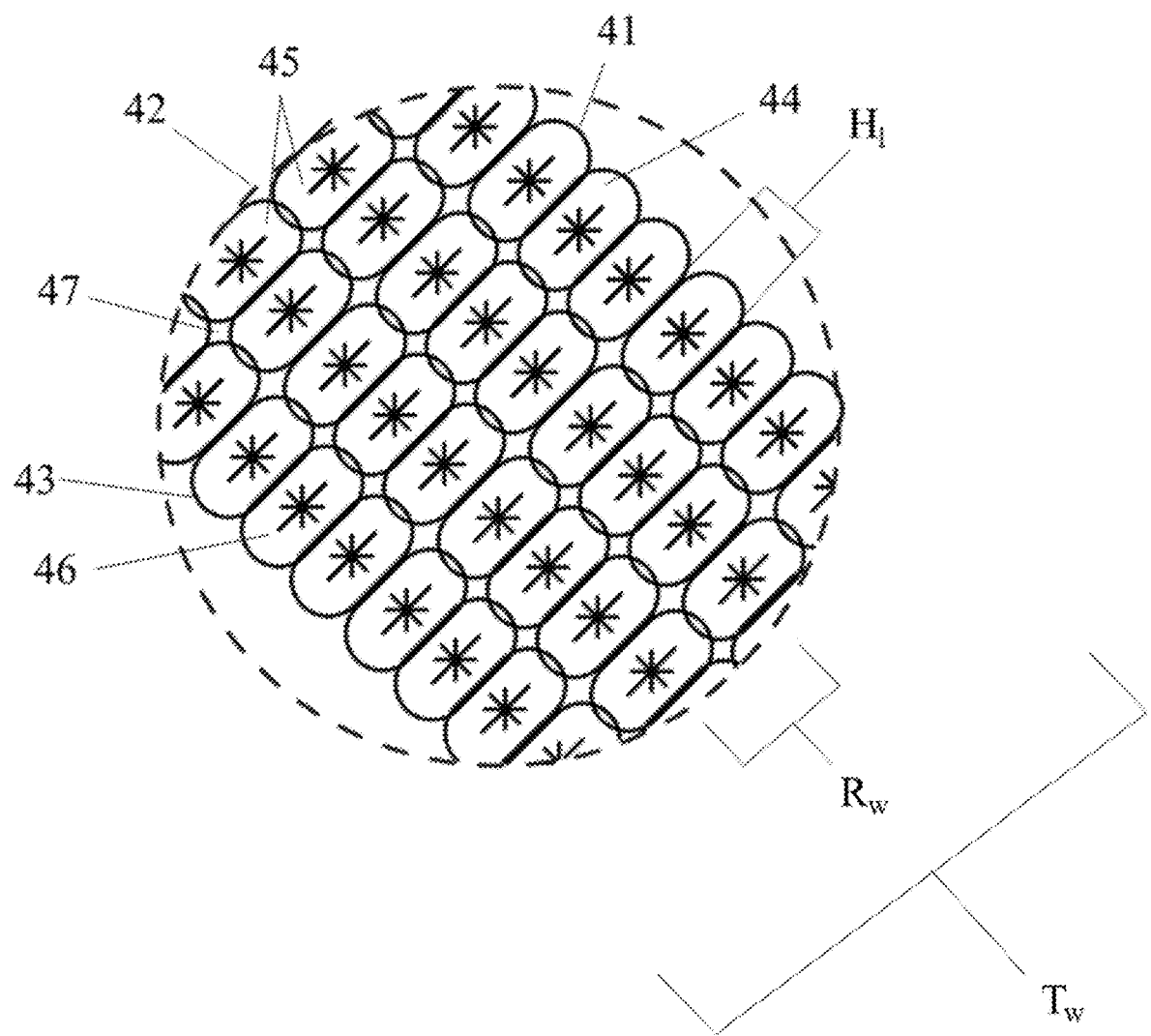
FIG. 2C is a magnified view of a portion of the wall of the endcap of the preform shown in FIG. 2.

As shown in FIG. 2C, the endcap (40) can comprise an exterior polymer road (44) and an interior polymer road (46) that surround at least a portion of the perimeter of the preform (10). The exterior polymer road (44) and an interior polymer road (46) can be concentric, with the interior polymer road (46) residing inside the exterior polymer road (44), i.e. towards the interior of the preform (10). The endcap (40) can comprise one or more wall polymer roads (45) that are placed between the interior polymer road (346) and the exterior polymer road (44).

The wall (42) of the endcap (40) can comprise any suitable number of wall polymer roads (45). For example, the wall (42) of the endcap (40) may comprise from greater than 0 to 10, from greater than 0 to 5, or from greater than 0 to 3 of the wall polymer roads (45). In total, the wall (42) of the body (40) can comprise from 2 to 12, from 2 to 7, or from 2 to 5 polymer roads, which include the interior polymer road (46), the exterior polymer road (44), and the wall polymer road (45). Alternatively, the wall (42) of the endcap (40) can have zero wall polymer roads (45), such that the wall (42) of the endcap (40), only has an exterior polymer road (44) and an interior polymer road (46).

The wall (42) of the endcap (40) can have a consistent thickness throughout, such as, for example, exactly 2 or exactly 4 polymer roads, or the wall (42) of the endcap (40) can vary in thickness, such as, for example, 2 polymer road thickness in some portions of the wall (42) and 4 polymer roads in some portions of the wall (42).

The thickness, $T_w$ in FIG. 2C, of the wall (42) of endcap (40) can be from about 0.5 mm to about 20 mm, from about 1 mm to about 20 mm, from about 1 mm to about 10 mm, from about 1 mm to about 3 mm, from about 2 mm to about 6 mm, or from about 2 mm to about 5 mm. The thickness, $T_w$ in FIG. 2C, of the wall (42) of endcap (40) can be greater than about 2 mm, greater than about 2.5 mm, or greater than about 2.75 mm. The thickness, $T_w$ in FIG. 2C, of the wall (42) of the endcap (40) can be a whole number multiple of the thickness of an individual wall polymer road (45) or the road width, $R_w$ in FIG. 2C.

Dimensions of the Preform

The dimensions of the preform (10) can be any suitable dimensions to provide the user with the desired finished article. For example, the total height, H, as shown in FIG. 1, of the preform (10) can be from about 10 mm to about 500 mm, from about 20 mm to about 250 mm, or from about 40 mm to about 125 mm. The total width, W, as shown in FIG. 1, of the preform (10) can be from about 1 mm to about 1 m, from about 5 mm to about 100 mm, from about 10 mm to about 30 mm, or from about 10 mm to about 20 mm. The total width, $W_i$ as shown in FIG. 2, the interior portion (50) of the preform (10) can be from about 1 mm to about 100 mm, from about 10 mm to about 50 mm, or from about 15 mm to about 35 mm.

Polymer Roads

The polymer roads (24, 25, 26, 34, 35, 36, 44, 45, 46) can comprise at least a partially continuous or a continuous stream of printed voxels corresponding to a set of digital voxels in a digital description of the preform (10). The digital description of the preform (10) can be in the form of a computer assisted design, such as for example, a CAD file.

The polymer roads (24-26, 34-36, and/or 44-46) can comprise one or more materials. Non-limiting examples include polymers, including those that are naturally sourced, synthetic polymers, and combinations thereof. Non-limiting examples of naturally sourced polymers can include alginates, gums, protein based polymers, starch based polymers, native starches, modified starches, fiber polymers, other naturally sourced polymers, and combinations thereof. Non-limiting examples of synthetic polymers can include polyolefin resins, such as polyethylene (PE) and polypropylene (PP), acrylates, such as poly methyl acrylate (PMA), carbonates, such as polycarbonate (PC), methacrylates, such as poly methyl methacrylate (PMMA), amides such as Nylon 6: Acetal, copolymers, such as acrylonitrile butadiene styrene (ABS), chlorinated polymers, such as polyvinyl chloride (PVC), styrenics, such as Polystyrene (PS), esters, such as polyethylene terephthalate (PET), modified esters such as PETG, polyformaldehyde such as Delrin, and/or mixtures thereof.

The polymer roads (24-26, 34-36, 44-46) can be any shape that can be extruded out of the nozzle of a 3D printer, such as, for example, substantially shaped as a cylinder, rectangular prism, triangular prism, or pentagonal prism. The polymer roads (24-26, 34-36, 44-46) can have straight or rounded edges and/or corners.

The one or more materials can comprise a reheat additive. A reheat additive is an additive capable of improving the reheat characteristics of a polymer or polymeric composition. Such reheat additives include, for example, $LaB_6$, carbon black, graphite, antimony metal, black iron oxide, red iron oxide, inert iron compounds, spinel pigments, infrared-absorbing dyes, tungsten oxides, antimony tin oxide (ATO), tungsten bronzes, titanium nitride, and other suitable reheat additives. The reheat additives can be nano-sized to minimize impact on clarity of the blow molded article.

The diameter of the polymer roads (24-26, 34-36, 44-46), or road width ($R_w$) can be any suitable size, including, for example, from about 0.1 mm to about 10 mm, from about 0.5 mm to about 5 mm, or from about 0.6 to about 1.5 mm as measured by the diameter of the extrusion nozzle.

It may be desirable to minimize the spacing between polymer roads (24-26, 34-36, 44-46) in the same layer and the spacing between successive layers of polymer roads (24-26, 34-36, 44-46) to prevent or minimize gaps, or void space (27, 37, 47), as in FIGS. 2A, 2B, and 2C, that can disrupt the blow molding process. Thus, the spacing between the polymer roads (24-26, 34-36, 44-46) in the same layer can be defined by the road width, R. The spacing between the polymer roads in the same layer (24-26, 34-36, 44-46) can be determined the distance between the centers of two adjacent deposited polymer roads (24-26, 34-36, 44-46), such as the difference between the center of an interior polymer road (24) and a wall polymer road (25), and the diameter of the extruded material, which can be approximated by the size of the nozzle used. When the road width is smaller than the diameter of the extruded material, the two concentric polymer roads will slightly overlap to minimize any void space. The spacing between the polymer roads (24-26, 34-36, 44-46) in the same layer can be from about 0 mm to about 10 mm, from about 0.25 mm to about 2 mm, or from about 0.5 mm to about 1 mm. The road width can be smaller, equal to, or larger than the diameter of the polymer road.

The spacing between the polymer roads (24-26, 34-36, 44-46) in different layers can be defined by the layer height, $H_1$ as shown in FIGS. 2A-2C. The layer height can be from 0 mm to about 10 mm, from 0 mm to about 0.1 mm, from 0.01 mm to about 0.05 mm, from 0.01 mm to about 0.04 mm, or from about 0.01 mm to about 0.03 mm.

Preform Design

In some cases, such as in the printing of overhangs, enclosed endcaps, and/or threads (28), the printed article can collapse without adequate support. The printed article's geometry can be designed such that overhangs are supported with a printed feature, such as scaffolding, that can be removed after cessation of the AM process. However, the process to manually remove such printed support features can be time intensive and a waste of material. Alternatively, the overhangs can be designed to begin gradually, such that the overhang is self-supporting and requires no other supporting features to prevent collapse of the feature.

The preform (10) can have self-supporting overhanging polymer roads. For example, as shown in FIG. 2, Angle A is the angle of the self-supporting overhang corresponding the endcap (40) of the preform (10). Angle A is the angle created by the inner surface (43) of wall (42) of the endcap (40) with respect to the build plate (100) of the 3D printer or cross-section line 3 of the preform (10) as depicted in FIG. 1. Angle B is the angle of the self-supporting overhang corresponding to the ledge (29) of the neck (20) with respect to the build plate (100) of the 3D printer or cross-section line 3 of the preform (10) as depicted in FIG. 1

The self-supporting overhangs can be described by the angle between an overhanging feature of the preform (10) and the build plate (100), as shown in FIG. 2. The self-supporting angle can be less than about 45°, less than about 40°, less than about 35°, or less than about 30°. The self-supporting angle can be from about 45° to about 0°, from about 45° to about 15°, from about 40° to about 20°, from about 35° to about 15°, less than 45° to about 0°, less than 45° to about 15°, or less than 45° to about 20°.

Surprisingly, the dimensions of a preform (10) made by AM can be different from the dimensions of a preform created by injection molding even though the end weight of the blow molded article can be kept about the same. Thus, the weight of the preform (10) can be consistent with a preform created by injection molding. However, the overall length of the preform (10) and the exact wall thickness can be modified to generate a preform (10) capable of surviving the blow molding process. For example, the preform (10) can have a shorter total height, H, but a greater wall (32) of the body (30) thickness, $T_w$, than an injection molded preform, but retain the same overall weight.

Additionally, the preform (10) can be printed with its widest portion adjacent to or associated with the build plate (100) of the 3D printer. The neck (20) of the preform (10) can be printed facing the build plate (100) of the 3D printer. The widest portion can be adjacent to or associated with the build plate (100) of the 3D printer to provide a base for the remaining portions of the preform (10) to reside on. This type of design can minimize overhangs when printing.

3D Printing Method

For 3D printing, a digital description of the article to be manufactured may be translated to the article, such as, for example, a preform (10), by the creation of an actual set of voxels corresponding to the set of voxels in the digital representation. This translation may be accomplished using known AM techniques including material extrusion techniques, and those techniques referred to as 3D printing, or three-dimensional printing techniques. The digital description can be in any digital format, such as, for example, a CAD file.

The digital voxels can be transformed into printed voxels in the shape of polymer roads (24-26, 34-36, 44-46) by any known means such as 3D printing. When 3D printed, for example, material forming the roads can be deposited into a two dimensional layer along the x-y plane with respect to the build plate (100) in any sequence, such as a linear, concentric, grid, triangular, tri-hexagonal, cubic, cubic subdivision, octet, quarter cubic, concentric 3D, zig zag, cross, cross 3D infill, spiral, any 2D pattern that fills the area between the interior road and exterior road linear to the x-y plane, and/or any 2D pattern that fills the area between the interior road and exterior road concentric to the 2D shape of the interior and exterior roads.

Once the digital representation of the object to be printed is loaded into a system capable of instructing hardware to undergo AM techniques, the hardware's parameters can be manipulated to affect the properties of the created item.

The nozzle and/or build-platform can move to allow for at least three dimensions of orthogonal motion relative to one another. Polymer roads can be deposited to form a two-dimensional layer and then another layer of fluid material is deposited over the preceding layer to form the three-dimensional object. The liquid droplet size and the distance between the dispensing nozzle and the proceeding layer control the printed voxel size and thus, the diameter or surface area of the polymer roads (24-26, 34-36, 44-46), as described herein.

Material for extrusion through the nozzle ("build materials") may be in any form, such as, for example, a filament, pellet, powder or liquid form. A plurality of build materials may be used. The build-platform, nozzle and any liquid reservoir can temperature controlled. A fan or air jets may be used to aid in cooling of extruded material. The final object may be post processed using any known methods including sanding, polishing and steaming to improve surface finish.

Each printed voxel that collectively creates with other printed voxels one or more polymer roads (24-26, 34-36, 44-46) can comprise one or more materials, including polymers. Non-limiting examples of polymers can include naturally sourced polymers, synthetic polymers, and combinations thereof. Each printed voxel that collectively creates one or more polymer roads (24-26, 34-36, 44-46) can comprise the same or different polymer composition as the other printed voxels.

Each printed voxel that collectively creates a polymer road (24-26, 34-36, 44-46) can have a variable size. Thus, the printed voxel size can be manipulated, such that a polymer road (24-26, 34-36, 44-46) can comprise printed voxels of varying dimensions. The dimensions of the printed voxel can be manipulated by changing the corresponding digital voxels or by modifying the printing parameters.

Each printed voxel that collectively creates a polymer road (24-26, 34-36, 44-46) can comprise one or more polymers with color concentrates and/or color additives. Suitable color concentrates are pigments and dyes. Suitable organic color concentrates include, for example, Cu-Phthalocyanine, Anthraquinone, Dioxazine, and Benzimidazolone. Suitable inorganic color concentrates include, for example, titanium dioxide, ultramarine, iron oxide, carbon black and pearl, and other metal pigments. Suitable additives include, for example, dispersing aides, antioxidants, fillers, slip promoters, UV absorbers, anti-static agents, nucleating agents, anti-blocking agents, and flame retardants.

Each printed voxel that collectively creates one or more polymer roads (24-26, 34-36, 44-46) can comprise the same or different pigment or dye as the remaining printed voxels. Collectively, this can allow for a preform (10) comprising roads and layers with unique color combinations that can allow for designs to be printed into the walls (22, 32, and 42) of the preform (10). Additionally, the design can be printed into the walls (22, 32, and 42) of the preform (10) such that the design to become apparent after blow molding the preform (10) into the blow molded article (90) as described herein. Some designs that can be printed in the preform (10) by altering the printed voxel color composition include, for example, graphics, logos, phrases, words, directions, warnings, labels, artwork, shapes, characters, or any other descriptive, marketing, or product identifying material.

The digital description of the preform (10) can be translated into an actual object through the use of 3D printing software. A variety of printing parameters can be manipulated, such as the geometry of the preform (10), the type, size, and number of nozzle(s) on the 3D printer or AM machine, the layer height, the number of roads of polymers (24-26, 34-36, 44-46), the infill density, the printing temperature, the build plate temperature, the filament flow, the filament retraction distance, the filament retraction speed, the print speed, the print head travel speed, the initial layer speed, the printhead travel acceleration, the fan speed, the build plate adhesion type, among others.

Additionally, an optimized material setting can prepopulate at least a portion of the printing parameters. Such optimized material settings include, for example, PE, CPE, PET, PP, PLA, and other preselected material settings.

The 3D printer can have at least one nozzle, one or more nozzles, one nozzle, two nozzles, less than three nozzles, three nozzles or four nozzles. The 3D printer extrudes a continuous stream of printed voxels in the form of filaments through one or more nozzles. The same composition of printed voxels can be extruded out of multiple nozzles or each nozzle can extrude a different composition of printed voxels.

The layer height, or $H_1$ in FIG. 2A-C, is the distance the build plate (100) is lowered (in the z direction) between each layer of printed material. Adjustment of the layer height can affect the volume of the void present between each layer of printed material. The layer height can be from about 0 mm to about 10 mm, from 0 mm to about 1 mm, from 0.1 mm to about 0.5 mm, from 0.1 mm to about 0.4 mm, or from about 0.1 mm to about 0.3 mm.

The thickness of the preform (10) is controlled by altering the number of polymer roads (24-26, 34-36, 44-46) as described previously. The thickness of the preform (10) can vary or be essentially consistent. The thickness of the preform (10) can vary to create grip structures, threads (28), a lid, a ledge (29) for the lid to rest, etc. associated with any of the exterior surfaces (21, 31, or 41) or interiors surfaces (23, 33, or 43) of the preform (10).

The infill density is the amount of polymer to be filled between the outer layers and inner layers of the preform (10). The infill density can be at least about 50%, at least about 75%, at least about 90%, or about 100%. The infill density can be from 0% to about 100%.

The printing temperature is the temperature at the nozzle. The printing temperature can be the same for all printed layers or the printing temperature can vary from layer to layer. The printing temperature can be a particular temperature for the initial layer printed and a different printing temperature for the remaining layers. The printing temperature can be any suitable temperature for the material used and the desired end result. The printing temperature can be a function of the selected material, and can be above the melting temperature for the selected material. For example, the printing temperature may be from about 150° C. to about 300° C., from about 175° C. to about 275° C., from about 200° C. to about 250° C., or from about 200° C. to about 225° C.

The build plate temperature is the temperature at the build plate (100), where the printed article rests during printing. The build plate temperature can be the same during the entire printing process or the build plate temperature can vary during the printing of any layer. The build plate temperature can be a particular temperature when initial layer is printed and a different build plate temperature for the remaining layers to aid in the initial adhesion of the printed article to the build plate (100). The build plate temperature can be a function of the selected material. The build plate temperature can be below the melting temperature of the selected material. The build plate temperature can be from about 20° C. to about 300° C., from about 50° C. to about 200° C., from about 50° C. to about 150° C., or from about 75° C. to about 125° C.

Filament flow is the quantity or volume of filament that passes through the nozzle based on the selected parameters. The filament flow can be from about 75% to about 125%, from about 80% to about 115%, or from about 90% to about 110%.

Between each printed layer, the filament, or polymer road, can be retracted while the nozzle is repositioned. The filament can be retracted to prevent loss of material or excess material inadvertently falling on unintended areas of the preform (10). The filament retraction distance is how far the filament, or polymer road, can be retracted from the tip of the nozzle. The filament retraction distance can be from about 1 mm to about 25 mm, from about 2 mm to about 15 mm or from about 4 mm to about 10 mm. The filament retraction speed is how fast the filament, or polymer road, is retracted from the tip of the nozzle. The filament retraction speed can be from about 10 mm/s to about 100 mm/s, from about 20 mm/s to about 60 mm/s, or from about 30 mm/s to about 50 mm/s.

The print speed is the speed the print head moves while printing. The print speed when the nozzle is printing an exterior polymer road (24, 34, or 44) can be different when compared with the print speed of an infill polymer road (23, 33, or 43). Additionally, the initial layer print speed can be faster or slower than the remaining layer print speed so that the initial layer may better adhere to the build plate (100). The print speed can be from about 5 mm/s to about 100 mm/s, from about 10 mm/s to about 75 mm/s, from about 15 mm/s to about 50 mm/s, or from about 20 mm/s to about 35 mm/s.

The print head travel acceleration can be changed. A slower print head acceleration will make the print slower, but more accurate. The print head travel acceleration can be from about 2000 mm/s$^2$ to about 10000 mm/s$^2$, from about 3000 mm/s$^2$ to about 8000 mm/s$^2$, or from about 4000 mm/s$^2$ to about 6000 mm/s$^2$.

Once a layer has been printed, the recently printed layer can be cooled prior to printing the next layer in the z direction. The recently printed layer can be cooled with a fan. Higher fan speeds can help reduce cooling time and reduce oozing, but can also increases the shrinkage of the material. This means that the fan speed may be different per material. The fan speed can be from about 0% to about 100%, from about 1% to about 10%, from about 2% to about 8%, or from about 2% to about 5%.

The fan speed for the initial printed layer can the same or different than the other recently printed layers. The fan speed for the initial printed layer can be from about 0% to about 25%, from about 1% to about 10%, from about 2% to about 8%, or from about 2% to about 5%.

Extra cooling jets can be used to increase the cooling rates of the recently printed layer. This can avoid excessive crystallization of the one or more polymers, such as, for example, semi-crystalline polymers like PET.

The distance from the recently printed layer and the fan/jets can be manipulated to affect the cooling of the recently printed layer. The distance between the recently printed layer and the fan can from about 0.5 mm to about 10 mm, from about 1 mm to about 10 mm, from about 2 mm to about 8 mm, or from about 6 mm to about 12 mm.

The initial layer of polymer roads can be printed in the x-y plane directly on top of the build plate (100). The parameters for the initial layer printing can be different from the remaining layers. Once the parameters have been satisfied for the initial layer printing, a subsequent layer is placed directly on top of the initial layer. After the parameters have been satisfied for the subsequent layer, another subsequent layer is placed on top of the subsequent layer. This process can be repeated until the preform (10) has been completely created.

Blow Molding Method

The preform (10) can be converted into the blow molded article (90) through either stretch blow molding (SBM) or blow molding (BM).

Blow molding is a well-known manufacturing process for the fabrication of plastic articles such as containers, fuel tanks, handles etc. The blow molding process begins with a preform (10), which can be produced by any number of different methods, including injection molding and the method disclosed herein. As in FIG. 4, the preform (10) can be clamped into a mold (99). The preform (10) can be heated to a temperature above the material's glass transition temperature, but below the preform's melt temperature. The temperature can be a function of the selected material. The temperature can be, for example, from about 80° C. to about 175° C., from about 90° C. to about 150° C., from about 100° C. to about 140° C., or from about 110° C. to about 130° C. The preform (10) can be heated from about 1 min to about 20 min, from about 2 min to about 15 min, or from about 5 min to about 10 min. The preform can be heated using any known means, such as a heated oil bath or infrared heat to heat the preform (10) to a uniform temperature.

A pressurized medium, such as, for example, compressed air, nitrogen, argon, or oxygen, can be blown or pumped into the preform (10). The pressure of the medium forces the plastic to match the peripheral geometry of the mold. Once the plastic has cooled, the mold opens up and the blow molded article is ejected. The pressure of the pressurized medium can start at a particular pressure and be altered through the blow molding process. The pressure of the pressurized medium can be any suitable pressure to provide the desired end result. For example, the pressurized medium can be pressurized to a pressure from about 0.1 bar to about 50 bar, from about 0.2 bar to about 25 bar, from about 0.4 bar to about 12 bar, or from about 1 bar to about 6 bar.

SBM is a blow molding method that additionally uses a stretch rod to stretch the preform (10) in the z direction during the blow molding process. The additional stretching experienced with a stretch rod can allow a greater number of polymer molecules to obtain biaxial orientation, than processes that do not use a stretch rod, which can improve the strength of the blow molded article. The stretch rod can be inserted into the preform (10) prior to, during, or after the pressurized medium has been introduced. The stretch rod can be inserted into the preform at a fixed length in the interior (50) of the preform (10). The stretch rod can be used to further stretch the endcap (40) of the preform (10).

The SBM process can include a blow delay. A blow delay is the time after the pressurized medium has been introduced that the stretch rod is introduced. The blow delay is the relative distance between where the stretch rod hits the interior surface (43) of the endcap (40) of the preform (10) (defined as T0) to the final distance the stretch rod travels (defined as T10), to slightly below the bottom of the mold, such as from about 0.1 mm to about 5 mm below the bottom of the mold. The full blow pressure applied in the interior portion (50) of the preform (10) can be delayed to help material positioning closer to the neck bottle. The blow delay can be from about 1% to about 30%, from about 2% to about 20%, or from about 3% to about 10%. A lower pre-blow pressure can be applied prior to T0 to avoid that the heated material touches the stretch rod as the stretch rod approaches T0.

Container

As shown in FIGS. 4 and 5, the blow molded article (90) can be a container or bottle. The blow molded article (90) can be formed from the 3D printed preform (10) after the blow molding process as described herein. The neck (20) can result in the neck (91) of the blow molded article (90). The body (30) can result in the body (92) of the blow molded article (90). The endcap (40) can result in the base (93) of the blow molded article (90). The neck (91), body (92), and base (93) can form a unitary blow molded article (90) with an interior surface (94) and an exterior surface (96). The interior portion (95) of the blow molded article (90) can be the void inside the interior surface (94) of the blow molded article (90).

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention. All exemplified amounts are concentrations by weight of the total composition, i.e., wt/wt percentages, unless otherwise specified.

Example 1

3D Printing of Preforms

Preforms (10) were created by first developing a digital description. The digital description of the preform was drawn in the Ultimaker Cura 3.4.1 (Geldermalsen, The Netherlands) software program. The digital description was exported as a CAD (computer assisted design) file. The filament used for 3D printing the preforms was Vertbatim™ (Mitsubishi Chemical, Tokyo, Japan) Polyethylene Terephthalate (PET) with a diameter of 1.75 mm. The 3D printer used was the Ultimaker 3 (Geldermalsen, The Netherlands).

The selected digital description was uploaded into the software program for the 3D Printer, Cura. Parameters for the 3D printing process were manipulated in Cura as described herein and in TABLE 1. As thousands of printing parameters exist, a group of optimized parameters, CPE, was selected to prepopulate a listing of optimized parameters. A variety of build parameters were then manipulated as in TABLE 1. The filament was melted at the printing temperature and fed through the nozzle. The printing temperature was slightly higher (215° C.) for the first printed layer compared with the remaining layers (212° C.). The first polymer road of the first layer was extruded from the nozzle using the infill type selected. The exterior polymer road (24, 34, or 44) was extruded and laid first directly on the build plate of the 3D printer.

When printing using the concentric infill parameter, the second polymer road was laid immediately adjacent (in the x-y plane) and immediately interior (i.e. concentric) to the exterior polymer road (24, 34, or 44). The remaining roads were filled in by laying progressively smaller concentric circles adjacent to the previously printed roads. The distance between the roads was the road width, $R_w$, or the center to center distance between two adjacent roads.

When printing using the linear infill parameter, the second polymer road laid was the interior polymer (26, 36, or 46). This leaves a void between the exterior polymer road (24, 34, or 44) and interior polymer road (26, 36, or 46). This void is filled in laying linear polymer roads between the previously printed circular roads.

Once the first layer in the x-y plane was printed, the build plate was lowered by the distance provided in in the layer height row of TABLE 1. The second layer was laid directly on top of the first layer. This process was repeated for the remaining layers to allow for the 3D printer to print along the z axis. The printing was stopped when the complete preform had been printed.

TABLE 1

3D Printed Preforms

| | Sample A | Sample B | Sample C |
| --- | --- | --- | --- |
| Diameter of Nozzle | 0.8 mm | 0.8 mm | 0.8 mm |
| Road Width | 0.7 mm | 0.7 mm | 0.7 mm |
| Optimized Parameter Settings | CPE[a] | CPE[a] | CPE[a] |
| Infill Density | 100% | 100% | 100% |
| Infill Type | Linear | Concentric | Concentric |
| Layer Height | 0.2 mm | 0.2 mm | 0.2 mm |
| Filament Flow | 105% | 105% | 105% |
| Printing Temperature[b] | 215/212 | 215/212 | 215/212 |
| Theoretical Body Wall Thickness | 2.8 mm | 2.8 mm | 3.5 mm |
| Experimental Thickness[c] | 2.4312 mm | 2.4789 mm | N/A |

[a]CPE is Co-polymer optimized parameter settings
[b]Printing temperature for the initial layer/subsequent layers in degrees Centigrade
[c]By Micro-CT The printing parameters for Sample A and Sample B are identical except for the infill type. Sample A was printed using a linear infill process while Sample B was printed with a concentric infill process. Sample C was also printed with a concentric infill process, but had a 3.5 mm theoretical body wall thickness whereas, Sample A and Sample B had a 2.8 mm theoretical body wall thickness. Thus, Sample A and Sample B are expected to have a 4 road thickness while Sample C is expected to have a 5 road thickness. Theoretical wall thickness was designed to be a multiple of the polymer road thickness to minimize void space between individual polymer roads. However, an even number of roads to fill the wall section was predicted for optimum infill because the software defaults to placing an even number of roads.

Example 2

Stretch Blow Molding of Printed Preforms 3D printed preforms were then blown into blow molded articles through a stretch blow molding process. The ability to create a blow molded article from a 3D printed preform was assessed by stretching the preforms using a PET bottle blower (Model No. SB6, Voehringer Engineering, Kornbergstrasse, Lichtenstein) with a 18-20 bar blowing capability. Routine optimization of stretch parameters for each 3D printed preform was conducted in order to produce the best bottle. This optimization is a routine step performed for any polyethylene-based material. Those skilled in the art would be able to perform this routine optimization without any inventive activity. Parameters to optimize included reheat temperature profile, blowing time, blow delay, max stretch rod distance, stretch rod pressure, and blow pressure. The presence of holes in the final container were assessed visually.

First, 3D printed preforms were placed in an oil bath for a defined period of time, as shown in TABLE 2. The 3D printed preforms were removed from the oil bath and quickly placed into a mold cavity of the desired shape, as in FIG. 4. The preform is designed with the size and shape of the mold cavity in mind. Thus, while the mold cavity can be changed, the design of the preform will also change accordingly.

The preform was sealed by placing an inverted cone over the neck of the preform. Once sealed compressed air was injected into the neck of the preform simultaneously with the start of the movement of the stretch rod. The preform was stretched with a stretch rod to a defined distance, the blow delay, when the air pressure was increased to the final air pressure, as in TABLE 2. The blow delay is the distance between when the initial position of the stretch rod and the position of the stretch rod when the air pressure was increased. The stretch rod came to rest at the Max Stretch Rod, as in TABLE 2. TABLE 2 summarizes the stretch blow molding results.

It was initially expected that the final air pressure applied during the stretch blow molding process of a 3D printed preform would be similar to the final air pressure applied during the stretch blow molding process of an injection molded preform. Traditional injection molded preforms are routinely stretch blow molded using pressures of greater than 20 bar. However, in TABLE 2, it was unexpected that air pressures of greater than 5 bar would result in holes in 3D printed preforms.

Additionally, TABLE 2 demonstrates that the heating conditions can affect whether a bottle can be formed through the stretch blow molding process. Either overheating or underheating the preform can result in the formation of holes in 3D printed preforms and the failure to result in a bottle. For example, neither Sample D (95-105° C.) nor Sample F (135-145° C.) resulted in bottles.

TABLE 2

Optimizing Stretch Blow Molding of 3D Printed Preforms

| | Oil Bath Conditions | Pressure (bar) | Blow Delay[a] | Max Stretch Rod[a] | Bottle Blown? |
|---|---|---|---|---|---|
| Sample D | 6 min at 95-105° C. | 25 | T4 | T0 | No |
| Sample E | 6 min at 125-130° C. | 5 | T0 | T0 | No |
| Sample F | 3 min at 135-145° C. | 5 | T10 | T10 | No |
| Sample G | 6 min at 120-130° C. | 4-5 | T0 | T0 | Yes |
| Sample H | 6 min at 120-130° C. | 4 | T4 | T10 | Yes |
| Sample I | 6 min at 120-130° C. | 4 | T2 | T6 | Yes |
| Sample J | 6 min at 120-130° C. | 3 | T3.5 | T10 | Yes |
| Sample K | 6 min at 120-130° C. | 4 | T4.5 | T10 | Yes |

[a]Values for Blow Delay and Max Stretch Rod are given as TX, where X is a relative number from 0 to 10. X is the distance between the current location of stretch rod and the initial location of the stretch rod. 0 is defined as the starting location of the stretch rod and 10 is the location of the stretch rod at its farthest extension, here the end cap of the bottle

Example 3

Micro-CT of Printed Preforms

The void space between the polymer roads were quantitatively measured using micro computed tomography (micro-CT). The CT scanner used in this method was a FlashCT model FCT2253 manufactured by Imtec Corporation, Ardmore, Okla. This FlashCT model was a cone beam micro-CT with a shielded walk-in cabinet. A dismountable Viscom XT9225-DED microfocus x-ray tube was used as the source. This x-ray tube had an adjustable focal spot size with maximum energy of 225 keV and a current range of 10 $\mu$A to 3000 $\mu$A. The transmitted x-rays passed through a collimator, a scintillator, and onto a 40 cm×40 cm Varex XRD 1621 flat panel x-ray detector. The detector model was a 200 $\mu$m pixel pitch amorphous silicon digital detector running up to 15 frames/second. The detector was located 880 mm from the X-ray Source.

To generate data an x-ray beam was passed through the sample and onto the detector. Some of the x-rays were attenuated by the sample. The extent of attenuation correlated to the mass of material the x-rays had to pass through. Thus, the transmitted x-rays were converted into a 2D projection image by the digital detector array. A full 3D dataset of the sample was generated by collecting several (~FOV pixel width×1.5) individual projection images of the sample as it was rotated. The instrument was interfaced with a computer running software (ZxAcquire DDA v. 3.1.13, Industrial Imaging Solutions, Santa Clara, Calif. The raw 2D projection data was reconstructed into a 3D image dataset using CT reconstruction and analysis software, efX-CT v.1.9.5.1 (North Star Imaging, Rogers, Minn.). The 3D image was reconstructed such that the radial center of the preform was aligned with one of the global axes.

The CT scanner was set up and calibrated according to the manufacturer's specifications. The sample to be scanned was mounted in a block of low density foam, such as Styrofoam or melamine foam, which allowed the signal from the sample to be easily separated from its surroundings for analysis. The foam block was mounted to the rotary stage and the sample was placed atop the foam block. The size of the 3D image field of view contained the entire sample, and the final resolution of the reconstructed 3D image had an isotropic voxel resolution of 34.7 μm (microns). Using the instrument control software, the scanning parameters were set to acquire a full 360-degree rotation of 2D projection images.

Images were acquired with the x-ray source energy settings optimized to give the best contrast for the given sample material, but once optimized held constant for all substantially similar samples. For example, the appropriate energy settings for the 3D printed preform samples was a voltage setting of 100 kVp and a current setting of 500 μA, with no additional low energy filter, 4 avg and a sample acquisition time (integration time) of 249 ms. The raw data was saved in 32-bit floating point format to preserve the full detector output signal for analysis. The data was processed to remove noise and make measurements as described in the next section. Software suitable for the subsequent image processing steps and quantitative image analysis includes programs such as Avizo Lite 9.4.0 available from Visualization Sciences Group/FEI Company, Burlington, Mass., U.S.A. and MATLAB 2018a Version 9.4, with corresponding MATLAB Image Processing Toolbox Version 10.2 available from The Mathworks Inc. Natick, Mass., U.S.A., or equivalents.

Image Processing

The 3D data set was aligned with the Z axis and trimmed along an xy plane above the neck and below the volume that forms the dome of the preform. The Z axis was 35 mm in length and resulted in 1010 xy voxel planes of the tubular volume of the preform. A threshold value was determined which separates the background signal due to air and foam, but maintains the signal from the preform material.

Noise from the dataset was removed on an xy slice by slice basis. For each slice, a convex hull was fitted around the preform. The area of this convex hull was then used to fit a circle around the preform perimeter. The circle was logically combined with the slice data such that a mask was generated that has: no noise in the outer void space of the preform and no void areas inside the circle/perimeter. Note that this mask separates any voids in the preform that may have touched the outer void area. The inner void of the tubular preform was found using connected components. Region filling was used to eliminate any noise in the inner void area. Removing the inner void from the circle/perimeter mask results in a mask of the preform volume. This volume is recorded for the 3d dataset. The mask is applied to the preform material image resulting in a noise free dataset which can be used to measure the material volume of the 3d dataset.

A measurement was made of the net amount of material between the inner diameter and outer diameter of the preform. For each xy slice, multiple line were drawn from the center of the fitted circle to each of its perimeter points. The number of material voxels along each line was summed. The material measurement was determined by scaling the material sum with the length of the line and the voxel size. The radial material amount was recorded in a new dataset at the location of the perimeter end point. This dataset was used to visualize the radial material distribution and provide an average radial material value.

Void space within the preform volume was characterized using a Local Thickness Map (LTM). The LTM assigns a void voxel the radial value of the largest sphere the can be fitted in that void space and contains that voxel. More information on LTM can be found at R. P. Dougherty and K-H Kunzelmann, "Computing Local Thickness of 3D Structures with ImageJ," Microscopy & Microanalysis, August, 2007. The preform void spaces were determined from the preform material image and the preform volume mask described earlier. Averaging the LTM values gives a weighted average of the void space openings in the preform.

Micro-CT experiments were run on Sample A (linear infill) and Sample B (concentric infill). The weighted average linear thickness was calculated as the average of the local thickness of each xy plane. Sample A and Sample B were designed to have body wall thickness of 2.80 mm (See Table 1). However, micro-CT determined the weighted average linear thickness of Sample A to be 2.4312 mm (0.3688 mm of void space). Sample B had slightly less void space (0.3211 mm) in each layer of at the body wall with a weighted average linear thickness of 2.4789 mm throughout Sample B.

TABLE 3

% of Printed Layers Below Assigned Threshold Value for Linear Thickness

| Threshold Value (mm) | % of Sample A Layers Below Threshold Value | % of Sample B Layers Below Threshold Value |
| --- | --- | --- |
| 2.00 | 2.09 | 1.00 |
| 2.10 | 3.89 | 1.82 |
| 2.15 | 5.04 | 2.39 |
| 2.20 | 6.43 | 3.15 |
| 2.25 | 8.37 | 4.11 |
| 2.30 | 11.40 | 5.67 |
| 2.40 | 23.49 | 13.76 |
| 2.50 | 50.27 | 37.64 |
| 2.60 | 77.72 | 65.44 |

TABLE 4

% of Printed Layers Below Average Linear Thickness

| Threshold Percentage (% of Average Linear Thickness[a]) | % of Sample A Layers Below Average | % of Sample B Layers Below Average |
| --- | --- | --- |
| 95 | 12.09 | 8.66 |
| 90 | 6.07 | 3.74 |
| 85 | 3.21 | 1.87 |
| 80 | 1.42 | 0.91 |
| 75 | 0.57 | 0.38 |
| 70 | 0.19 | 0.14 |

[a]Weighted average linear thickness for Sample A (2.4312 mm) and Sample B (2.4789 mm)

Additionally, TABLE 3 shows that Sample A had more poorly printed layers than Sample B. TABLE 3 assigns threshold values and describes what percentage of printed layers fall below the selected threshold values. For example, 2.09% of Sample A's printed layers have an actual thickness of below 2.00 mm, while only 1.00% of Sample B's printed layers have an actual thickness of below 2.00 mm. Additionally, 8.37% of Sample A's printed layers have an actual thickness of below 2.25 mm, while only 4.11% of Sample B's printed layers have an actual thickness of below 2.25 mm. Thus, the concentric infill (Sample B) provides a thicker wall with less void space. This leads to a stronger wall that can withstand the blow molding process.

TABLE 4 also shows that Sample A had more poorly printed layers than Sample B. TABLE 3 assigns a threshold percentage and describes what percentage of printed layers fall below the selected threshold percentages. For example, 12.09% of Sample A's layers have a thickness that is less than 95% of Sample A's weighted average linear thickness. Only 8.66% of Sample B's layers have a thickness that is less than 95% of Sample B's average linear thickness. Thus, Sample A has more layers that were poorly printed, which led to larger void spaces. Larger void spaces can lead to failures in the blow molding process.

Figure 6:
FIG. 6 is a high-resolution micro computed tomography image of Sample A
Figure 7:
FIG. 7 is a high-resolution micro computed tomography image of Sample B

Collectively, TABLE 3 and TABLE 4 demonstrate that samples with concentric infill have thicker walls with less void space compared with samples with linear infill. FIG. 6 shows the LTM for a preform with line infill. FIG. 7 shows the LTM for a preform with concentric infill. The red pixels are layers with a thinner amount of material and larger amounts of void space. The line infill (FIG. 6) preform has a larger amount of void space while the concentric infill (FIG. 7) preform has less void space. A smaller amount of void space is linked with a better blow molding result. As such, the concentric infill build parameter can allow for a 3D printed preform to be successful blown into a blow molded article when a similar 3D printed preform constructed with a line infill pattern will not.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A preform for producing a blow molded article comprising:
    an open-ended neck comprising an exterior neck polymer road forming an exterior surface of the neck of the preform and an interior neck polymer road forming an interior surface of the neck of the preform;
    a body comprising
        an exterior body polymer road forming an exterior surface of the body of the preform and an interior body polymer road forming an interior surface of the body of the preform,
        a body infill portion between the exterior body polymer road and the interior body polymer road comprising one or more wall body polymer roads, wherein the one or more wall body polymer roads are concentric to the exterior body polymer road and the interior body polymer road;
    and a closed endcap comprising:
        an exterior endcap polymer road forming an exterior surface of the endcap of the preform and an interior endcap polymer road forming an interior surface of the endcap of the preform,
        an endcap infill portion between the exterior endcap polymer road and the interior endcap polymer road comprising one or more wall endcap polymer roads, wherein the one or more wall endcap polymer roads are concentric to the exterior endcap polymer road and the interior endcap polymer road, and wherein the exterior body polymer road, the interior body polymer road, and the body infill portion form a layer of a wall of the body wherein the wall of the body comprises less than about 12% of layers with an actual thickness less than 95% of a weighted average thickness of the wall of the body.

2. The preform of claim 1, wherein the wall of the body has a thickness of from about 2 mm to about 6 mm.

3. The preform of claim 1, wherein the wall of the body has a thickness that is a whole number multiple of a road width of the one or more wall body polymer roads.

4. The preform of claim 1, wherein the exterior endcap polymer road, the interior endcap polymer road, and endcap infill portion form a wall of the endcap.

5. The preform of claim 4, wherein the wall of the endcap has a thickness of from about 2 mm to about 6 mm.

6. The preform of claim 1, wherein the wall of the body has a weighted average thickness of greater than 2.44 mm.

7. The preform of claim 1, wherein the wall of the body comprises less than 2% of layers with an actual thickness of less than 2.00 mm.

8. A blow molded article made from the preform of claim 1.

9. A preform for producing a blow molded article comprising:
    an open-ended neck comprising one or more polymer roads;
    a body comprising one or more layers of one or polymer roads forming a wall of the body; and
    a closed endcap comprising one or more polymer roads,
    wherein the wall of the body comprises less than about 12% of layers with an actual thickness less than 95% of a weighted average thickness of the wall of the body.

* * * * *